(12) United States Patent
Hanrahan

(10) Patent No.: US 12,723,760 B2
(45) Date of Patent: Sep. 1, 2026

(54) AIRCRAFT POWERPLANT WITH BOOSTED TURBINE ENGINE AND FUEL CELL SYSTEM

(71) Applicant: RTX Corporation, Farmington, CT (US)

(72) Inventor: Paul R. Hanrahan, Sedona, AZ (US)

(73) Assignee: RTX Corporation, Farmington, CT (US)

( * ) Notice: Subject to any disclaimer, the term of this patent is extended or adjusted under 35 U.S.C. 154(b) by 138 days.

(21) Appl. No.: 18/913,016

(22) Filed: Oct. 11, 2024

(65) Prior Publication Data

US 2026/0104165 A1 Apr. 16, 2026

(51) Int. Cl.

| | |
|---|---|
| ***F23R 3/28*** | (2006.01) |
| ***F02C 6/02*** | (2006.01) |
| ***F02C 6/10*** | (2006.01) |
| ***H01M 8/0606*** | (2016.01) |
| *H01M 8/12* | (2016.01) |

(52) U.S. Cl.

CPC .................. *F23R 3/28* (2013.01); *F02C 6/02* (2013.01); *F02C 6/10* (2013.01); *H01M 8/0606* (2013.01); *H01M 2008/1293* (2013.01); *H01M 2250/20* (2013.01)

(58) Field of Classification Search

CPC .... F02C 6/02; F02C 6/10; F02C 7/224; F23R 3/28; H01M 8/0606

See application file for complete search history.

(56) References Cited

U.S. PATENT DOCUMENTS

| | | | |
|---|---|---|---|
| 3,963,372 | A | 6/1976 | Mclain |
| 5,413,879 | A | 5/1995 | Domeracki |
| 5,555,722 | A | 9/1996 | Mehr-Ayin |
| 5,562,190 | A | 10/1996 | Mcarthur |
| 6,834,831 | B2 | 12/2004 | Daggett |
| 8,118,253 | B1 | 2/2012 | Casado Abarquero |
| 10,724,432 | B2 | 7/2020 | Shapiro |
| 10,760,484 | B2 | 9/2020 | Alecu |
| 10,822,100 | B2 | 11/2020 | Dindar |

(Continued)

FOREIGN PATENT DOCUMENTS

JP 6770696 B2 10/2020

OTHER PUBLICATIONS

EP search report for EP25208133.6 dated Mar. 18, 2026.

*Primary Examiner* — Scott J Walthour
(74) *Attorney, Agent, or Firm* — Getz Balich LLC

(57) ABSTRACT

A powerplant for an aircraft includes a first turbine engine, a second turbine engine and a fuel cell system. The second turbine engine includes a second engine flowpath, a second engine compressor section, a second engine combustor section and a second engine turbine section. The second engine flowpath extends from a second engine flowpath inlet to a second engine flowpath outlet. The second engine flowpath inlet and the second engine flowpath outlet are each fluidly coupled with a flowpath of the first turbine engine. The fuel cell system includes a fuel cell, a fuel circuit and an air circuit. The fuel circuit extends through the fuel cell and is fluidly coupled with and upstream of a first fuel injector in the second engine combustor section. The air circuit extends through the fuel cell and is fluidly coupled with and downstream of a bleed from the second engine flowpath.

18 Claims, 6 Drawing Sheets

(56) References Cited

U.S. PATENT DOCUMENTS 11,143,142 B2 10/2021 Hanrahan
11,239,470 B2 2/2022 Hart
11,519,337 B2 12/2022 Redford
11,970,282 B2 4/2024 Wang
12,037,127 B2 7/2024 Palmer
2005/0284150 A1 12/2005 Dittmar
2006/0260323 A1 11/2006 Moulebhar
2011/0173988 A1 7/2011 Sweet
2015/0122944 A1 5/2015 Dauriac
2015/0275758 A1 10/2015 Foutch
2016/0032787 A1* 2/2016 Hong ...................... F01K 23/10
60/774
2016/0273396 A1 9/2016 Ekanayake
2016/0355272 A1 12/2016 Moxon
2018/0051584 A1 2/2018 Malkamäki
2018/0141675 A1 5/2018 Halsey
2018/0163558 A1 6/2018 Vondrell
2018/0291807 A1 10/2018 Dalal
2019/0323426 A1 10/2019 Mackin
2020/0040848 A1 2/2020 Hanrahan
2020/0056497 A1 2/2020 Terwilliger
2020/0158213 A1 5/2020 Leque
2020/0400077 A1 12/2020 Redford
2023/0138892 A1 5/2023 Wang
2023/0391467 A1* 12/2023 Palmer ...................... F02C 7/22
2023/0415902 A1 12/2023 Hanrahan
2024/0287936 A1* 8/2024 Wang .................. H01M 8/0618
2024/0287938 A1* 8/2024 Wang ...................... F02C 7/232

* cited by examiner

AIRCRAFT POWERPLANT WITH BOOSTED TURBINE ENGINE AND FUEL CELL SYSTEM

BACKGROUND OF THE DISCLOSURE

1. Technical Field

This disclosure relates generally to an aircraft and, more particularly, to a multi-engine powerplant for the aircraft.

2. Background Information

Various types and configurations of powerplants are known in the art for an aircraft. While these known aircraft powerplants have various benefits, there is still room in the art for improvement. There is a need in the art, in particular, for an improved multi-engine aircraft powerplant.

SUMMARY OF THE DISCLOSURE

According to an aspect of the present disclosure, a powerplant is provided for an aircraft. This aircraft powerplant includes a first turbine engine, a second turbine engine and a fuel cell system. The first turbine engine includes a first engine flowpath, a first engine compressor section, a first engine combustor section and a first engine turbine section. The first engine flowpath extends through the first engine compressor section, the first engine combustor section and the first engine turbine section from a first engine flowpath inlet into the first engine flowpath to a first engine flowpath exhaust from the first engine flowpath. The second turbine engine includes a second engine flowpath, a second engine compressor section, a second engine combustor section and a second engine turbine section. The second engine flowpath extends through the second engine compressor section, the second engine combustor section and the second engine turbine section from a second engine flowpath inlet into the second engine flowpath to a second engine flowpath outlet from the second engine flowpath. The second engine flowpath inlet and the second engine flowpath outlet are each fluidly coupled with the first engine flowpath. The fuel cell system includes a fuel cell, a fuel circuit and an air circuit. The fuel circuit extends through the fuel cell and is fluidly coupled with and upstream of a first fuel injector in the second engine combustor section. The air circuit extends through the fuel cell and is fluidly coupled with and downstream of a bleed from the second engine flowpath.

According to another aspect of the present disclosure, another powerplant is provided for an aircraft. This aircraft powerplant includes a turbine engine and a fuel cell system. The turbine engine includes an engine flowpath, an engine compressor section, an engine combustor section and an engine turbine section. The engine flowpath extends through the engine compressor section, the engine combustor section and the engine turbine section from an engine flowpath inlet into the engine flowpath to an engine flowpath outlet from the engine flowpath. The engine combustor section includes a combustor and a fuel injector arranged with the combustor. The fuel cell system includes a solid oxide fuel cell, a fuel circuit and an air circuit. The fuel circuit extends through the solid oxide fuel cell. The fuel circuit is fluidly coupled with and upstream of the fuel injector. The air circuit extends through the solid oxide fuel cell from an air circuit inlet into the air circuit to an air circuit outlet from the air circuit. The air circuit inlet is fluidly coupled with the engine flowpath upstream of the combustor. The air circuit outlet is fluidly coupled with the engine flowpath downstream of the combustor.

According to still another aspect of the present disclosure, another powerplant is provided for an aircraft. This aircraft powerplant includes a turbine engine, a powerplant housing and a fuel cell system. The turbine engine includes an engine flowpath, an engine compressor section, an engine combustor section and an engine turbine section. The engine flowpath extends through the engine compressor section, the engine combustor section and engine turbine section from an engine flowpath inlet into the engine flowpath to an engine flowpath outlet from the engine flowpath. The powerplant housing includes an engine case, a nacelle and a compartment formed by and disposed between the engine case and the nacelle. The engine case houses the engine compressor section, the engine combustor section and the engine turbine section. The fuel cell system includes a solid oxide fuel cell, a fuel circuit and an air circuit. The solid oxide fuel cell is disposed outside of the engine case within the compartment. The fuel circuit extends through the solid oxide fuel cell and is fluidly coupled with and upstream of a fuel injector in the engine combustor section. The air circuit extends through the solid oxide fuel cell and is fluidly coupled with and downstream of a bleed from the engine flowpath.

The fuel cell is configured as or otherwise includes a solid oxide fuel cell.

The second engine combustor section may include a second engine combustor. The bleed may be upstream of the second engine combustor along the second engine flowpath.

An outlet from the air circuit may be fluidly coupled with the second engine flowpath at or downstream of the bleed along the second engine flowpath.

An outlet from the air circuit may be fluidly coupled with the second engine flowpath downstream of the second engine combustor along the second engine flowpath.

The air circuit may be fluidly coupled with the second engine flowpath in parallel with a combustion chamber within a second engine combustor within the second engine combustor section.

The fuel cell system may also include a fuel reformer. The fuel circuit may extend through the fuel reformer upstream of the fuel cell.

The second engine combustor section may include the first fuel injector and a second fuel injector. The second fuel injector may be fluidly decoupled from the fuel cell.

The second engine combustor section may include the first fuel injector and a second fuel injector. The fuel cell may also be fluidly coupled with and upstream of the second fuel injector.

The first turbine engine may also include an engine case housing the first engine compressor section, the first engine combustor section and the first engine turbine section. The fuel cell may be arranged outside of the engine case.

The aircraft powerplant may also include a nacelle. The fuel cell may be arranged in a compartment formed by and between the engine case and the nacelle.

The second turbine engine may also include an engine case housing the second engine compressor section, the second engine combustor section and the second engine turbine section. The fuel cell may be arranged outside of the engine case.

The first engine combustor section may include a first engine combustor. The second engine flowpath inlet and the second engine flowpath outlet may each be fluidly coupled with the first engine flowpath upstream of the first engine combustor.

The second engine flowpath inlet may be at or upstream of the second engine flowpath outlet along the first engine flowpath.

The aircraft powerplant may also include a gear system. The first turbine engine may also include a first engine rotating assembly operatively coupled to the gear system. The first engine rotating assembly may include a first engine turbine rotor in the first engine turbine section. The second turbine engine may also include a second engine rotating assembly operatively coupled to the gear system. The second engine rotating assembly may include a second engine turbine rotor in the second engine turbine section.

The aircraft powerplant may also include a powerplant accessory. The gear system may be configured as or otherwise include a differential drive operatively coupling the first engine rotating assembly and the second engine rotating assembly to the powerplant accessory.

The first turbine engine may be configured as or otherwise include a turbofan engine.

The aircraft powerplant may also include a propulsor rotor rotatably driven by a rotating assembly within the first turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
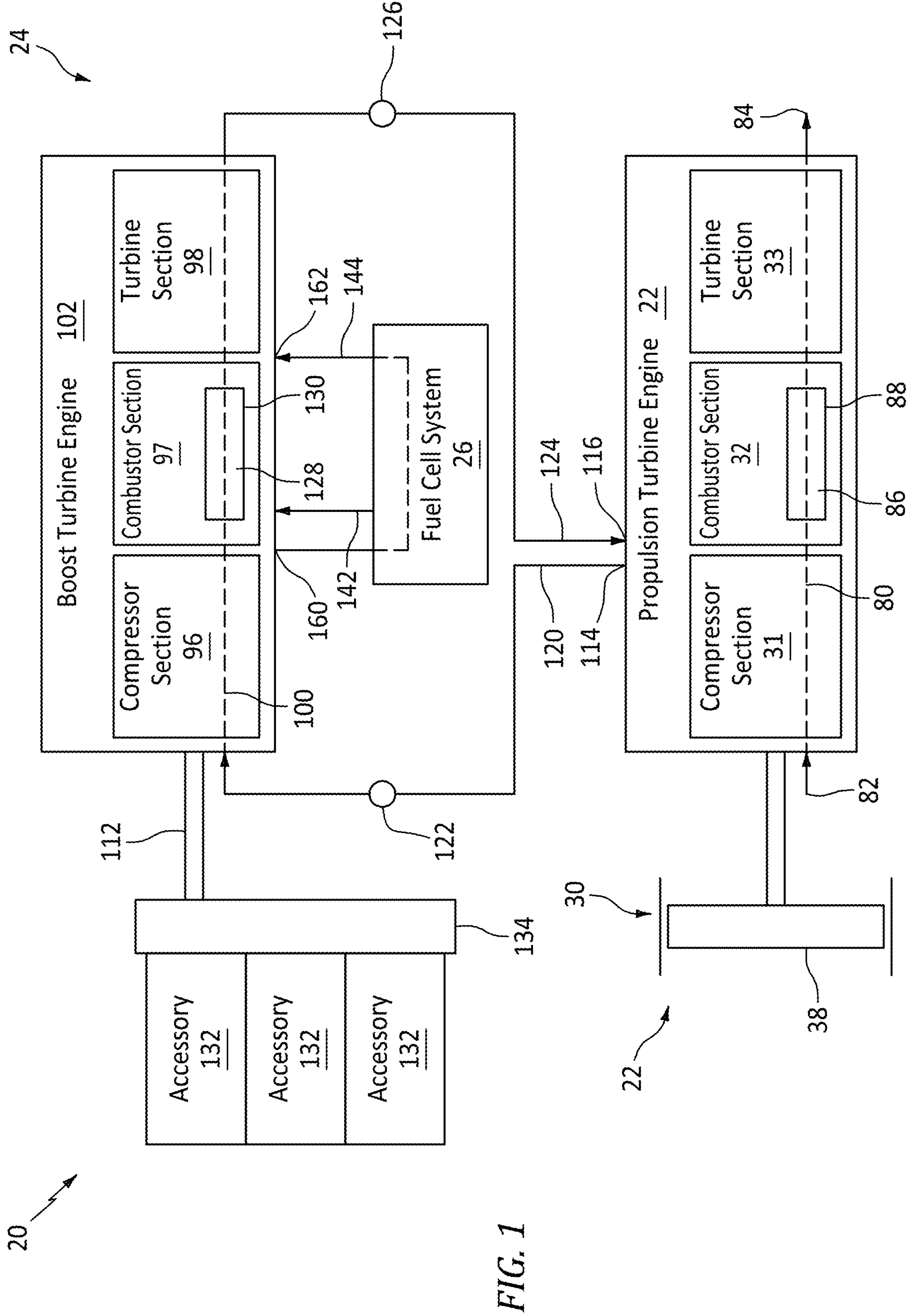
FIG. 1 is a schematic illustration of a multi-engine powerplant for an aircraft.

FIG. 1 illustrates a multi-engine powerplant 20 for an aircraft. The aircraft may be an airplane, a rotorcraft (e.g., a helicopter), a drone (e.g., an unmanned aerial vehicle (UAV)) or any other manned or unmanned aerial vehicle or system. The aircraft powerplant 20 may be configured as, or otherwise included as part of, a propulsion system for the aircraft. For ease of description, this aircraft propulsion system is described below as a ducted rotor propulsion system such as a turbofan propulsion system. The present disclosure, however, is not limited to such an exemplary aircraft propulsion system. The aircraft propulsion system, for example, may alternatively be configured as a turbojet propulsion system, a turboprop propulsion system, a propfan propulsion system, a pusher fan propulsion system, or a rotorcraft propulsion and/or lift system. The aircraft powerplant 20 of FIG. 1 may also (or alternatively) be configured as, or otherwise included as part of, an electrical power system for the aircraft. The aircraft powerplant 20 of FIG. 1, for example, includes a propulsion turbine engine 22, a boost turbine engine 24 and a fuel cell system 26.

Figure 2:
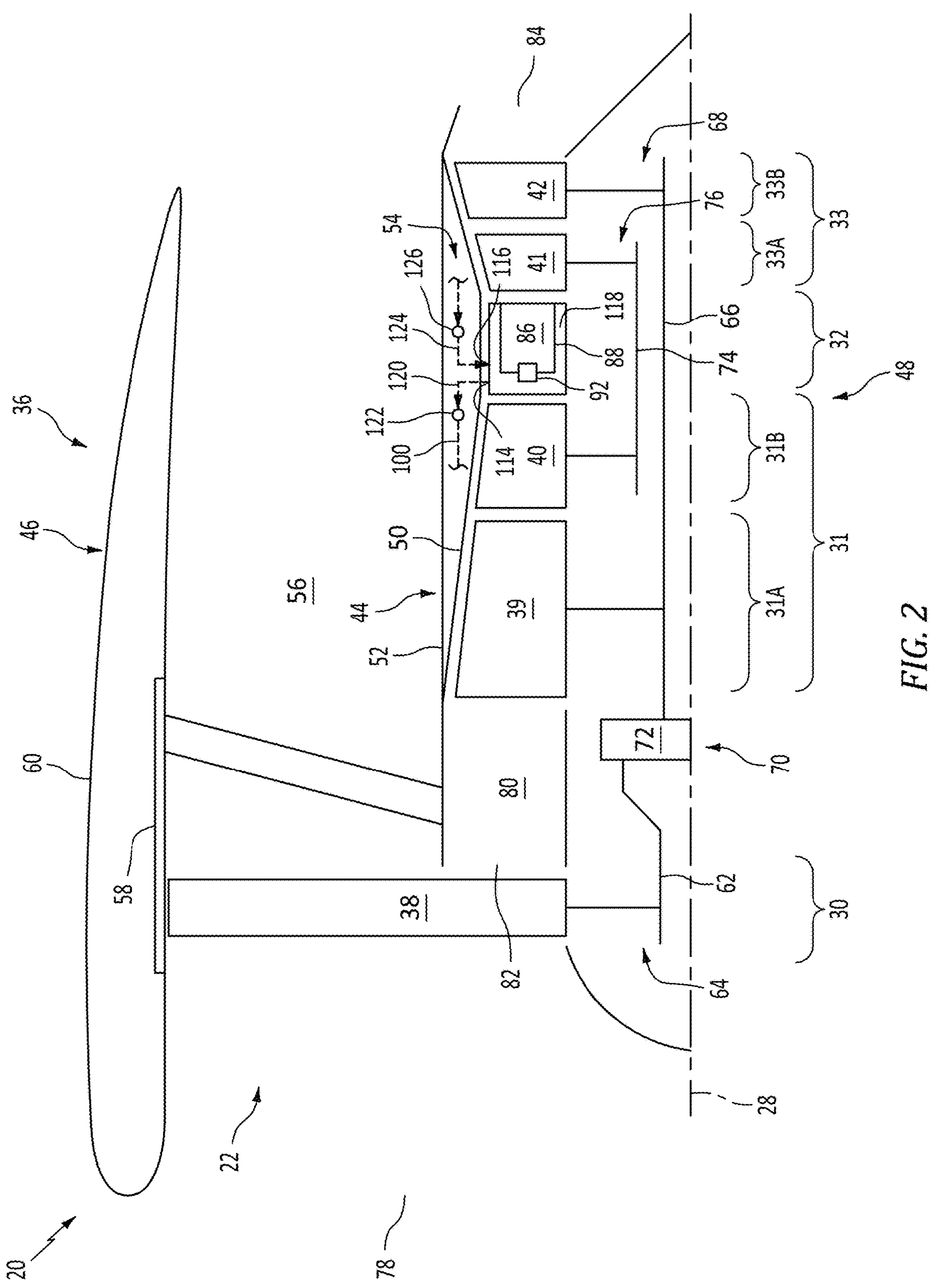
FIG. 2 is a partial schematic illustration of a propulsion turbine engine within an engine housing.

Referring to FIG. 2, the propulsion turbine engine 22 extends axially along a propulsion engine axis 28 between an axial forward, upstream end of the propulsion turbine engine 22 and an axial aft, downstream end of the propulsion turbine engine 22. Briefly, the propulsion engine axis 28 may be a centerline axis of the propulsion turbine engine 22 and/or one or more of its members. The propulsion engine axis 28 may also or alternatively be a rotational axis for one or more members of the propulsion turbine engine 22. The propulsion turbine engine 22 may be configured as a turbofan engine. The propulsion turbine engine 22 of FIG. 2, for example, includes a propulsor section 30 (e.g., a fan section), a compressor section 31, a combustor section 32 and a turbine section 33. The compressor section 31 of FIG. 2 includes a low pressure compressor (LPC) section 31A and a high pressure compressor (HPC) section 31B. The turbine section 33 of FIG. 2 includes a high pressure turbine (HPT) section 33A and a low pressure turbine (LPT) section 33B.

The propulsion engine sections 30-33B may be arranged sequentially along the propulsion engine axis 28 within a stationary engine housing 36 for the aircraft powerplant 20. The propulsor section 30 includes a bladed propulsor rotor 38; e.g., a fan rotor. The LPC section 31A includes a bladed low pressure compressor (LPC) rotor 39. The HPC section 31B includes a bladed high pressure compressor (HPC) rotor 40. The HPT section 33A includes a bladed high pressure turbine (HPT) rotor 41. The LPT section 33B includes a bladed low pressure turbine (LPT) rotor 42. These propulsion engine rotors 38-42 are housed within the engine housing 36. The engine housing 36 of FIG. 2, for example, includes an inner housing structure 44 and an outer housing structure 46. Here, at least (or only) the LPC section 31A, the HPC section 31B, the combustor section 32, the HPT section 33A and the LPT section 33B collectively form a core 48 (e.g., a gas generator) of the propulsion turbine engine 22.

The inner housing structure 44 of FIG. 2 includes an inner engine case 50 for the propulsion turbine engine 22, an inner nacelle structure 52 (sometimes referred to as an inner fixed structure (IFS)) and an internal housing compartment 54. The inner engine case 50 is disposed radially outboard of, extends axially along and may circumscribe one or more or all of the propulsion engine sections 31A-33B and their respective propulsion engine rotors 39-42. The inner engine case 50 may thereby house and provide a support structure for the respective propulsion engine sections 31A-33B and their respective propulsion engine rotors 39-42. The inner nacelle structure 52 is configured to provide an aerodynamic cover over the engine core 48 and its inner engine case 50. The housing compartment 54 of FIG. 2 is formed by and is disposed radially between the inner engine case 50 and an inner barrel of the inner nacelle structure 52. The inner housing structure 44 and its inner nacelle structure 52 may also form a radial inner peripheral boundary of a (e.g., annular) bypass flowpath 56 within the aircraft powerplant 20.

The outer housing structure 46 of FIG. 2 includes an outer engine case 58 (e.g., a fan case) for the propulsion turbine engine 22, and an outer nacelle structure 60. The outer engine case 58 is disposed radially outboard of, extends axially along and may circumscribe the propulsor section 30 and its propulsor rotor 38. The outer engine case 58 may thereby house and provide a containment structure for the propulsor section 30 and its propulsor rotor 38. The outer nacelle structure 60 is configured to provide an aerodynamic cover over the outer engine case 58. The outer housing structure 46 and its outer nacelle structure 60 may also form a radial outer peripheral boundary of the bypass flowpath 56.

The propulsor rotor 38 of FIG. 2 is connected to and rotatable with a propulsor shaft 62; e.g., a fan shaft. At least (or only) the propulsor rotor 38 and the propulsor shaft 62 collectively form a propulsor rotating assembly 64. This propulsor rotating assembly 64 of FIG. 2 and its members 38 and 62 are rotatable about the propulsion engine axis 28.

The LPC rotor 39 is coupled to and rotatable with the LPT rotor 42. The LPC rotor 39 of FIG. 2, for example, is connected to the LPT rotor 42 through a low speed shaft 66. At least (or only) the LPC rotor 39, the LPT rotor 42 and the low speed shaft 66 collectively form a low speed rotating assembly 68; e.g., a low speed spool of the engine core 48. This low speed rotating assembly 68 of FIG. 2 and its members 39, 42 and 66 are rotatable about the propulsion engine axis 28; however, it is contemplated the low speed rotating assembly 68 may alternatively be rotatable about another axis radially and/or angularly offset from the propulsion engine axis 28. The low speed rotating assembly 68 of FIG. 2 is also coupled to the propulsor rotating assembly 64. The low speed rotating assembly 68 of FIG. 2, for example, is connected to the propulsor rotating assembly 64 through a drivetrain 70. This drivetrain 70 may be configured as a geared drivetrain, where a geartrain 72 (e.g., a transmission, a speed change device, an epicyclic geartrain, etc.) is disposed between and operatively couples the propulsor rotating assembly 64 to the low speed rotating assembly 68 and its LPT rotor 42. With this arrangement, the propulsor rotor 38 may rotate at a different (e.g., slower) rotational speed than the low speed rotating assembly 68 and its LPT rotor 42. However, the drivetrain 70 may alternatively be configured as a direct drive drivetrain, where the geartrain 72 is omitted. With such an arrangement, the propulsor rotor 38 may rotate at a common (the same) rotational speed as the low speed rotating assembly 68 and its LPT rotor 42.

The HPC rotor 40 is coupled to and rotatable with the HPT rotor 41. The HPC rotor 40 of FIG. 2, for example, is connected to the HPT rotor 41 through a high speed shaft 74. At least (or only) the HPC rotor 40, the HPT rotor 41 and the high speed shaft 74 collectively form a high speed rotating assembly 76; e.g., a high speed spool of the engine core 48. This high speed rotating assembly 76 of FIG. 2 and its members 40, 41 and 74 are rotatable about the propulsion engine axis 28; however, it is contemplated the high speed rotating assembly 76 may alternatively be rotatable about another axis radially and/or angularly offset from the propulsion engine axis 28.

During operation of the propulsion turbine engine 22 of FIG. 2, ambient air (e.g., air from outside of the aircraft) enters the aircraft powerplant 20 and its propulsion turbine engine 22 through an airflow inlet 78. This air is directed across the propulsor rotor 38 and into a (e.g., annular) core flowpath 80 and the bypass flowpath 56. The core flowpath 80 of FIG. 2 extends sequentially through the LPC section 31A, the HPC section 31B, the combustor section 32, the HPT section 33A and the LPT section 33B from an airflow inlet 82 into the core flowpath 80 to an exhaust 84 out from the core flowpath 80. Here, the exhaust 84 may include a combustion products exhaust from the propulsion turbine engine 22 and, more generally, the aircraft powerplant 20. The air entering the core flowpath 80 may be referred to as "core air". The bypass flowpath 56 of FIG. 2 extends through a (e.g., annular) bypass duct. This bypass flowpath 56 and its bypass duct bypass (e.g., are disposed radially outboard of and extend along) the engine core 48. The air entering the bypass flowpath 56 may be referred to as "bypass air".

The core air is compressed by the LPC rotor 39 and the HPC rotor 40 and is directed into a (e.g., annular) combustion chamber 86 of a (e.g., annular) combustor 88 in the propulsion engine combustor section 32. Fuel is injected into the combustion chamber 86 by one or more propulsion engine fuel injectors 92 and mixed with the compressed core air to provide a fuel-air mixture. This fuel-air mixture is ignited and combustion products thereof flow through and sequentially drive rotation of the HPT rotor 41 and the LPT rotor 42 about the propulsion engine axis 28. The rotation of the HPT rotor 41 and the LPT rotor 42 respectively drive rotation of the HPC rotor 40 and the LPC rotor 39 about the propulsion engine axis 28 and, thus, compression of the air received from the propulsion engine core inlet 82. The rotation of the LPT rotor 42 also drives rotation of the propulsor rotor 38 about the propulsion engine axis 28. The rotation of the propulsor rotor 38 propels the bypass air through and out of the bypass flowpath 56. The propulsion of the bypass air may account for a majority of thrust generated by the aircraft powerplant 20 and its propulsion turbine engine 22.

Figure 3:
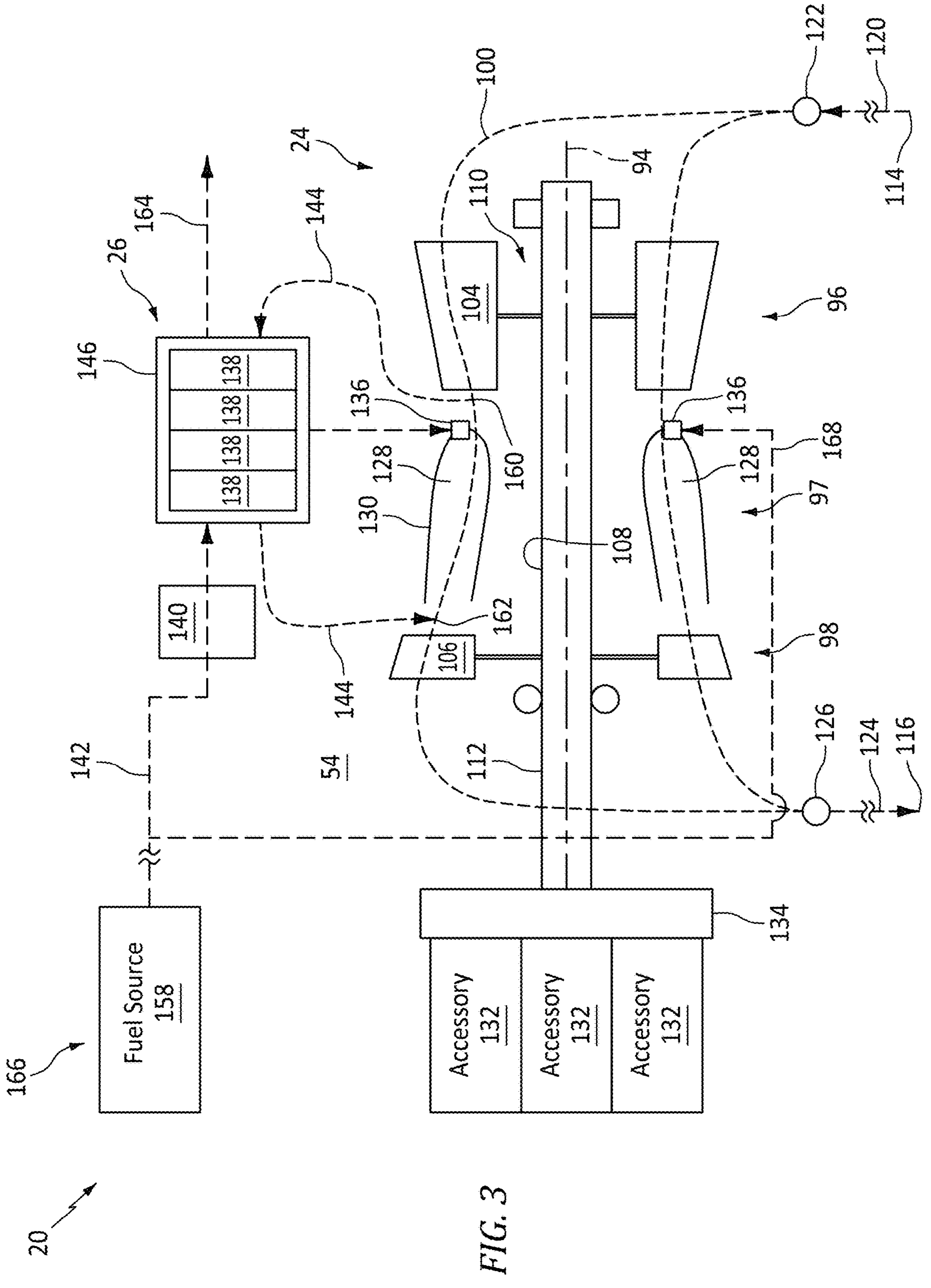
FIG. 3 is a partial schematic illustration of a boost turbine engine with a fuel cell system and an accessory gearbox coupled to engine accessories.

Referring to FIG. 3, the boost turbine engine 24 extends axially along a boost engine axis 94 between an axial forward, upstream end of the boost turbine engine 24 and an axial aft, downstream end of the boost turbine engine 24. Briefly, the boost engine axis 94 may be a centerline axis of the boost turbine engine 24 and/or one or more of its members. The boost engine axis 94 may also or alternatively be a rotational axis for one or more members of the boost turbine engine 24. The boost turbine engine 24 may be configured as a turboshaft engine. The boost turbine engine 24 of FIG. 1, for example, includes a boost engine compressor section 96, a boost engine combustor section 97 and a boost engine turbine section 98. This boost turbine engine 24 also includes a boost engine flowpath 100.

The boost engine sections 96-98 may be arranged sequentially along the boost engine axis 94 within a boost engine housing 102 (see FIG. 1); e.g., a case. The boost engine compressor section 96 includes a bladed compressor rotor 104. The boost engine turbine section 98 includes a bladed turbine rotor 106. These boost engine rotors 104 and 106 are housed within the boost engine housing 102 of FIG. 1. The boost engine housing 102 of FIG. 1, for example, is disposed radially outboard of, extends axially along and may circumscribe one or more or all of the boost engine sections 96-98 and their respective boost engine rotors 104 and 106 of FIG. 3.

The compressor rotor 104 of FIG. 3 is coupled to and rotatable with the turbine rotor 106. The compressor rotor 104 of FIG. 3, for example, is connected to the turbine rotor 106 through a boost engine shaft 108. At least (or only) the compressor rotor 104, the turbine rotor 106 and the engine shaft 108 collectively form a boost engine rotating assembly 110. This engine rotating assembly 110 of FIG. 3 and its members 104, 106 and 108 are rotatable about the boost engine axis 94. The engine rotating assembly 110 may be coupled to (or, the engine rotating assembly 110 may also include) an engine mechanical drive 112; e.g., a driveshaft, a drive coupling, etc.

The engine flowpath 100 of FIG. 3 extends sequentially through the boost engine compressor section 96, the boost engine combustor section 97 and the boost engine turbine section 98 from an airflow inlet 114 into the engine flowpath 100 to a combustion products outlet 116 out from the engine flowpath 100. Here, the flowpath inlet 114 may also be an airflow inlet into the boost turbine engine 24. Similarly, the flowpath outlet 116 may also be a combustion products exhaust from the boost turbine engine 24.

Referring to FIG. 2, the flowpath inlet 114 is fluidly coupled with the propulsion turbine engine 22 and its core flowpath 80. The flowpath inlet 114 is configured as or otherwise includes at least one bleed (e.g., an orifice, a scoop, etc.) along the core flowpath 80. The flowpath inlet 114 is thereby configured to receive (e.g., bleed) the core air from the core flowpath 80, for example upstream of the propulsion engine combustor 88 and its propulsion engine combustion chamber 86. More particularly, the flowpath inlet 114 of FIG. 2 is formed by and/or in a component (e.g., a flowpath wall, a vane arrangement, etc.) in the propulsion turbine engine 22. The flowpath inlet 114 may be located in/along the propulsion engine compressor section 31 and, more particularly, the HPC section 31B. Alternatively, the flowpath inlet 114 may be located in/along the propulsion engine combustor section 32. The flowpath inlet 114 of FIG. 2, for example, is located at (e.g., on, adjacent or proximate) a diffuser between the HPC section 31B and a plenum 118 surrounding the propulsion engine combustor 88. Referring to FIG. 1, the flowpath inlet 114 is fluidly coupled to the boost engine compressor section 96 through an inlet duct 120. The inlet duct 120 (or the flowpath inlet 114) may be configured with a flowpath regulator 122 (e.g., a valve, a valve system, etc.) for regulating the flow of the core air diverted out of (e.g., bled from) the core flowpath 80 to the boost turbine engine 24 and its engine flowpath 100.

Referring to FIG. 2, the flowpath outlet 116 is fluidly coupled with the propulsion turbine engine 22 and its core flowpath 80. This flowpath outlet 116 is configured to direct exhaust (e.g., combustion products) from the boost turbine engine 24 into the core flowpath 80, for example upstream of the propulsion engine combustor 88 and its propulsion engine combustion chamber 86 and/or downstream of the flowpath inlet 114. The flowpath outlet 116 of FIG. 2, for example, is formed by and/or in a component (e.g., a flowpath wall, a vane arrangement, etc.) in the propulsion turbine engine 22. The flowpath outlet 116 may be located in/along the propulsion engine combustor section 32. The flowpath outlet 116 of FIG. 2, for example, is located at the diffuser. Referring to FIG. 1, the flowpath outlet 116 is fluidly coupled to the propulsion engine compressor section 31 through an outlet duct 124; e.g., an exhaust duct. The outlet duct 124 (or the flowpath outlet 116) may be configured with a flowpath regulator 126 (e.g., a valve, a valve system, etc.) for regulating the flow of the gas exhausted out from the boost turbine engine 24 and directed into the propulsion turbine engine 22.

During operation of the boost turbine engine 24 of FIGS. 1 and 2, a flow of the compressed core air is bled from the propulsion turbine engine 22 and its core flowpath 80 via the flowpath inlet 114 and directed into the engine flowpath 100. This bleed air directed into the engine flowpath 100 of FIG. 3 may be referred to as "boost engine core air".

Referring to FIG. 3, the boost engine core air is compressed by the compressor rotor 104 and is directed into a (e.g., annular) combustion chamber 128 of a (e.g., annular) combustor 130 in the boost engine combustor section 97. Fuel is injected into the boost engine combustion chamber 128 by one or more boost engine fuel injectors 136 and mixed with the compressed boost engine core air to provide a fuel-air mixture. This fuel-air mixture is ignited and combustion products thereof flow through and drive rotation of the turbine rotor 106 about the boost engine axis 94. The rotation of the turbine rotor 106 drives rotation of the compressor rotor 104 about the boost engine axis 94 and, thus, compression of the core air received from the flowpath inlet 114.

The rotation of the turbine rotor 106 of FIG. 1 also drives rotation of the engine mechanical drive 112. This engine mechanical drive 112 is configured to output mechanical power for use by one or more engine accessories 132. The engine mechanical drive 112 of FIG. 1, for example, is operatively coupled to the engine accessories 132 through an accessory gearbox 134. The engine mechanical drive 112 of FIG. 1 may thereby drive rotation of inputs to the engine accessories 132 through the accessory gearbox 134. Examples of the engine accessories 132 include, but are not limited to, a fluid pump (e.g., a fuel pump, a lubricant pump, a coolant pump and/or an actuation fluid pump such as a hydraulic pump), an auxiliary air compressor (e.g., a compressor for a cabin environmental system), an electrical generator, and the like. The power provided to the engine mechanical drive 112 from the turbine rotor 106 may raise the expansion ratio of the turbine rotor 106 such that the pressures at the flowpath inlet 114 and the flowpath outlet 116 are substantially the same.

An overall pressure ratio (OPR) of the propulsion turbine engine 22 may increase as the thrust generated by the propulsion turbine engine 22 and its propulsor rotor 38 increases. Conversely, the overall pressure ratio of the propulsion turbine engine 22 may decrease as the thrust generated by the propulsion turbine engine 22 and its propulsor rotor 38 decreases. A pressure of the core air directed into the engine flowpath 100 through the flowpath inlet 114 therefore is (a) relatively low when the thrust generated by the propulsion turbine engine 22 and its propulsor rotor 38 is relatively low and (b) relatively high when the thrust generated by the propulsion turbine engine 22 and its propulsor rotor 38 is relatively high. Typically, the engine accessories 132 powered by the engine mechanical drive 112 may be designed to receive a substantially uniform (e.g., constant) power input independent of thrust generated by the aircraft powerplant 20 and its propulsion turbine engine 22. The boost turbine engine 24 therefore may work more when the pressure of the bled core air is relatively low/the thrust generated by the propulsion turbine engine 22 and its propulsor rotor 38 is relatively low. Conversely, the boost turbine engine 24 may work less when the pressure of the bled core air is relatively high/the thrust generated by the propulsion turbine engine 22 and its propulsor rotor 38 is relatively high. The boost turbine engine 24 and its engine rotating assembly 110 thereby operate with a relatively high pressure ratio (PR) at relatively low thrust and with a relatively low pressure ratio at relatively high thrust. This back and forth may reduce the swing in temperature of the boost engine core air at a location along the engine flowpath 100 between the boost engine compressor section 96 and the boost engine combustor 130 (see FIG. 3). The boost turbine engine 24 may thereby provide compressed air to the fuel cell system 26, as described below in further detail, at a substantially uniform (e.g., constant) temperature.

The fuel cell system 26 of FIG. 3 includes one or more fuel cells 138, a fuel reformer 140, a fuel circuit 142 and an air circuit 144. The fuel cells 138 of FIG. 3 are arranged in a stack 146. Briefly, in the arrangement of FIG. 3, the reformer 140 is disposed outside of the fuel cell stack 146 and its fuel cells 138.

Each of the fuel cells 138 may be configured as a solid oxide fuel cell (SOFC). Each fuel cell 138 of FIG. 4, for example, includes a fuel passage 148, an air passage 150, an anode 152, a cathode 154 and an electrolyte 156. The fuel passage 148 extends through the respective fuel cell 138, where a peripheral boundary of the fuel passage 148 within the respective fuel cell 138 is formed by and extends along the anode 152. The air passage 150 extends through the respective fuel cell 138, where a peripheral boundary of the air passage 150 within the respective fuel cell 138 is formed by and extends along the cathode 154. The anode 152 is disposed between and separates the fuel passage 148 and the electrolyte 156. This anode 152 may be formed from a relative porous electrically conductive material which facilitates flow of fuel cell fuel (e.g., gaseous hydrogen ($H_2$)) from the fuel passage 148 towards the electrolyte 156. The cathode 154 is disposed between and separates the air passage 150 and the electrolyte 156. This cathode 154 may be formed from a relative porous electrically conductive material which facilitates (a) oxygen reduction of the air received from the air passage 150 to provide oxygen ions and (b) movement of the oxygen ions towards the electrolyte 156. The electrolyte 156 may be a relatively dense layer of a solid oxide disposed between and separating the anode 152 and the cathode 154.

The fuel circuit 142 fluidly couples a fuel source 158 to the fuel cells 138 and one or more of the boost engine fuel injectors 136. The fuel circuit 142 of FIG. 3, for example, extends from an outlet of the fuel source 158, through the fuel cells 138, and to the respective boost engine fuel injectors 136. The fuel circuit 142 of FIG. 3, for example, includes each fuel passage 148, where these fuel passages 148 are arranged in parallel with one another.

The air circuit 144 fluidly couples the engine flowpath 100 with the fuel cells 138. The air circuit 144 of FIG. 3, for example, extends through the fuel cells 138 from an airflow inlet 160 into the air circuit 144 to an airflow outlet 162 from the air circuit 144. The circuit inlet 160 may be configured as or otherwise include a bleed from the engine flowpath 100. This circuit inlet 160 is arranged upstream of the boost engine combustor 130 along the engine flowpath 100. The circuit inlet 160 of FIG. 3, for example, is disposed at a downstream end of the boost engine compressor section 96 and its compressor rotor 104. The circuit outlet 162 may be configured as or otherwise includes an outlet to the engine flowpath 100. This circuit outlet 162 is arranged downstream of the boost engine combustor 130 along the engine flowpath 100. The circuit outlet 162 of FIG. 3, for example, is disposed at an upstream end of the boost engine turbine section 98 and its turbine rotor 106.

During fuel cell system operation, the fuel source 158 delivers fuel to the fuel circuit 142. This fuel may be a hydrocarbon fuel such as kerosene (e.g., Jet A fuel), sustainable aviation fuel (SAF), diesel, natural gas, propane, or the like. The fuel circuit 142 directs this fuel through the reformer 140 and to each of the fuel cells 138. Within the reformer 140, at least some of the fuel is cracked (e.g., broken down) into various components including gaseous hydrogen ($H_2$). Simultaneously, a quantity of the boost engine core air is bled from the engine flowpath 100 through the circuit inlet 160. The air circuit 144 directs this bleed air to each of the fuel cells 138.

Figure 4:
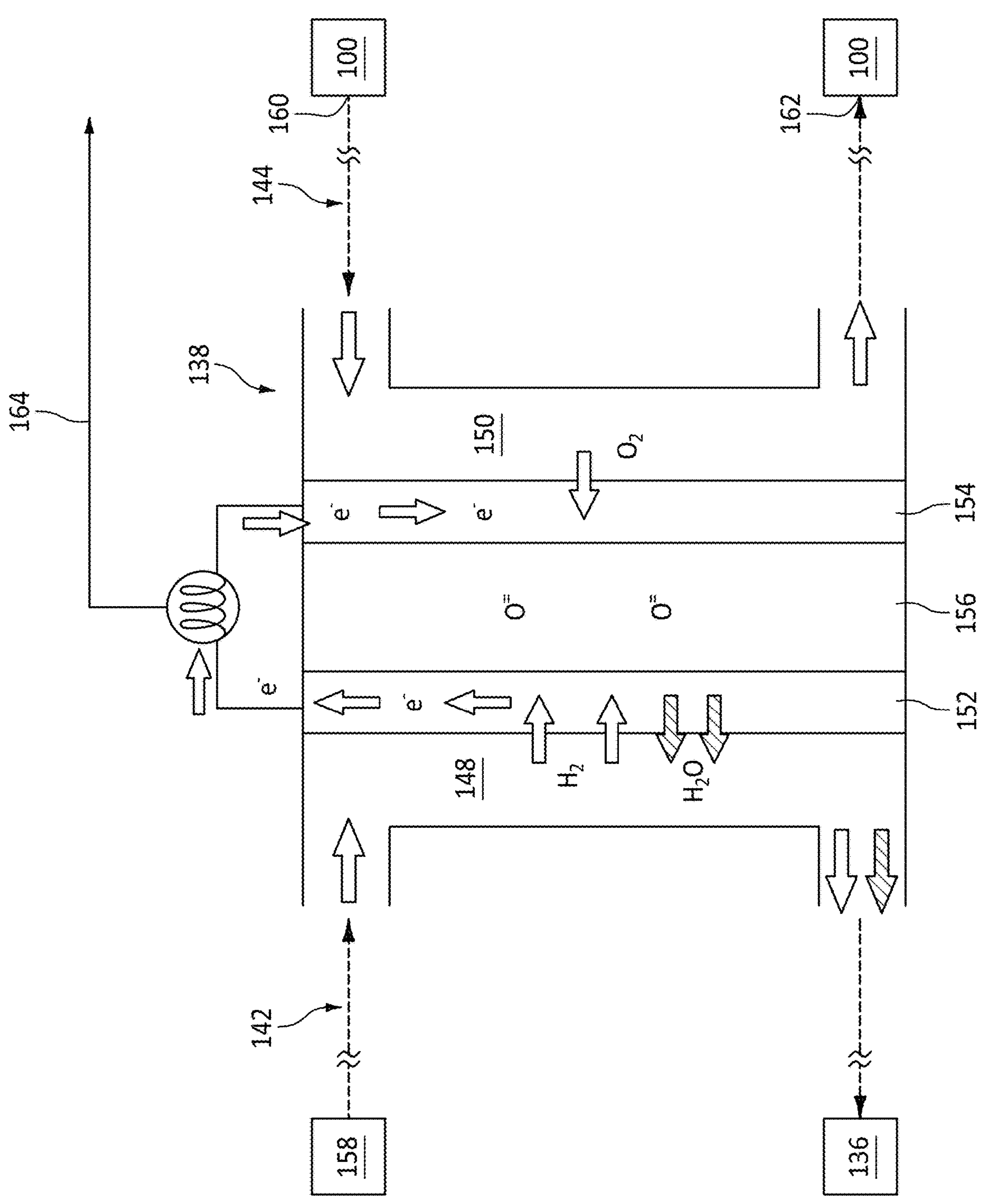
FIG. 4 is a partial schematic illustration of the fuel cell system at a fuel cell.

Referring to FIG. 4, within each fuel cell 138, at least some of the cracked fuel (e.g., the hydrogen gas) flows into and/or across the anode 152 toward the electrolyte 156. Oxidation reduction of the air occurs along the cathode 154. Oxygen ions produced from the oxidation reduction of the air diffuse across the electrolyte 156 to the anode 152, where those oxygen ions react with the hydrogen gas to form water ($H_2O$) molecules. These water molecules flow across the anode 152 and enter the fuel passage 148. The diffusion of the oxygen ions from the cathode 154, across the electrolyte 156, to the anode 152 may generate an electric current. This electric current is output from the respective fuel cell 138 and, more generally, the fuel cell stack 146 of FIG. 3 to supply electrical power to one or more electrical components of the aircraft powerplant 20 and/or one or more electrical components of the aircraft outside of the aircraft powerplant 20 through an electrical bus 164, for example. The fuel cell stack 146 thereby operates as an electric generator for the aircraft powerplant 20.

The water molecules and the remaining (e.g., unreacted) fuel is directed out of the fuel cell stack 146 and delivered to the respective boost engine fuel injector(s) 136 for injection into the boost engine combustor 130, where the fuel is mixed with the compressed boost engine core air and subsequently combusted as described above. Simultaneously, the remaining (e.g., unreacted) bleed air is directed out of the fuel cell stack 146 and delivered to the engine flowpath 100. Potential energy may thereby be recuperated from the air discharged from the fuel cell system 26 back into the engine flowpath 100 for driving the rotation of the turbine rotor 106 along with the combustion products generated within the boost engine combustor 130. In addition, a thermodynamic cycle of the boost turbine engine 24 may be enhanced by utilizing heat generated by the reaction within the fuel cell stack 146 through the heated air discharged into the engine flowpath 100 and the heated fuel delivered to the respective boost engine fuel injector(s) 136.

A fuel system 166 for the boost turbine engine 24 may deliver (a) a first portion of the fuel to the boost turbine engine 24 through the fuel cell system 26 and (b) a second portion of the fuel to the boost turbine engine 24 through a bypass circuit 168 which bypasses the fuel cell system 26. This second portion of the fuel may be equal to or greater than the first portion of the fuel. In some embodiments, the first portion of the fuel and the second portion of the fuel may be delivered to the same boost engine fuel injectors 136. In other embodiments, the first portion of the fuel may be delivered to a first set of the boost engine fuel injector(s) 136, and the second portion of the fuel may be delivered to a second set of the boost engine fuel injector(s) 136. However, in other embodiments, it is contemplated the fuel system 166 may flow all of the fuel through the fuel cell system 26; e.g., the bypass circuit 168 may be omitted.

In some embodiments, referring to FIG. 3, the fuel cell stack 146 and the reformer 140 may be arranged outside of the inner engine case 50 (see FIG. 2) within, for example, the housing compartment 54. Here, the fuel cell stack 146 and the reformer 140 may also be arranged outside of the boost turbine engine 24 and its boost engine housing 102 (see FIG. 1). With such an arrangement, the fuel cell stack 146 and the reformer 140 may be readily accessible for inspection and maintenance without, for example, significant or possibly any disassembly of the turbine engines 22 and/or 24.

Figure 5:
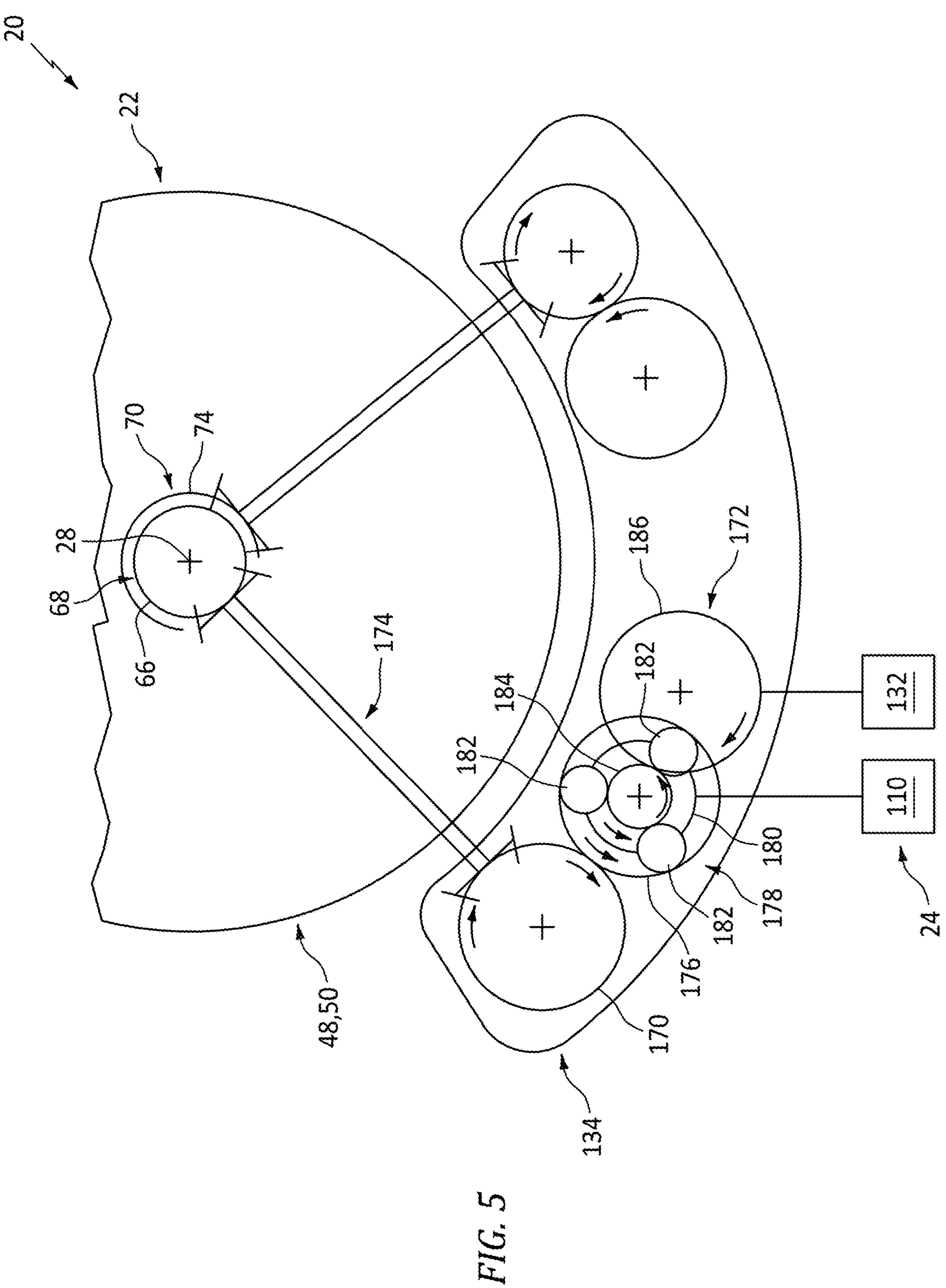
FIG. 5 is a partial schematic illustration of the multi-engine powerplant at the accessory gearbox.

In some embodiments, referring to FIG. 5, both the engine rotating assembly 110 and the low speed rotating assembly 68 may be operatively coupled to one or more of the engine accessories 132; see also FIGS. 1 and 3. The low speed rotating assembly 68 of FIG. 5, for example, is operatively coupled to a drive gear 170 of a gear system 172 within the accessory gearbox 134 through a tower shaft assembly 174. The drive gear 170 is meshed with an exterior of a ring gear 176 of a differential drive 178 of the gear system 172. The engine rotating assembly 110 is operatively coupled to a rotatable carrier 180 of the differential drive 178. This carrier 180 rotatably supports one or more intermediate gears 182 of the differential drive 178, which intermediate gears 182 are meshed with and radially between an interior of the ring gear 176 and an exterior of a sun gear 184 of the differential drive 178. The sun gear 184 is also meshed with a driven gear 186 of the gear system 172, which driven gear 186 is operatively coupled to the one or more of the engine accessories 132.

Figure 6:
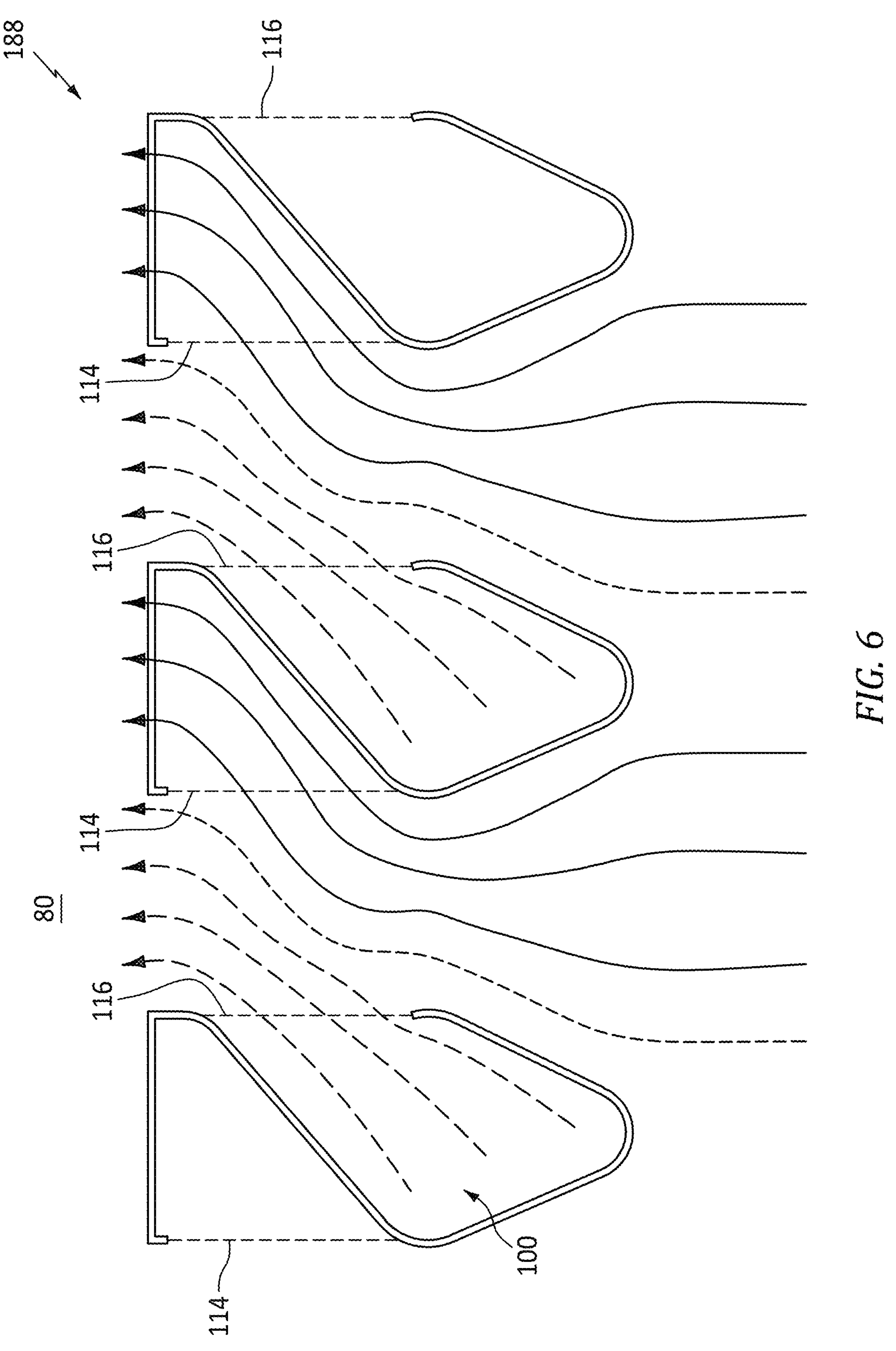
FIG. 6 is a partial plan view illustration of a boost engine flowpath of the boost turbine engine fluidly coupled with a core flowpath of the propulsion turbine engine.

In some embodiments, referring to FIG. 2, the flowpath inlet 114 may be arranged upstream of the flowpath outlet 116 along the core flowpath 80. In other embodiments, referring to FIG. 6, the flowpath inlet 114 may alternatively be arranged downstream of the flowpath outlet 116 along the core flowpath 80. The flowpath inlet 114 and the flowpath outlet 116, for example, may be arranged with a stator vane structure 188 configured to reduce or prevent ingestion of the combustion products exhausted from the flowpath outlet 116 into the flowpath inlet 114.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A powerplant for an aircraft, comprising:

a first turbine engine including a first engine flowpath, a first engine compressor section, a first engine combustor section and a first engine turbine section, the first engine flowpath extending through the first engine compressor section, the first engine combustor section and the first engine turbine section from a first engine flowpath inlet into the first engine flowpath to a first engine flowpath exhaust from the first engine flowpath;

a second turbine engine including a second engine flowpath, a second engine compressor section, a second engine combustor section and a second engine turbine section, the second engine flowpath extending through the second engine compressor section, the second engine combustor section and the second engine turbine section from a second engine flowpath inlet into the second engine flowpath to a second engine flowpath outlet from the second engine flowpath, and the second engine flowpath inlet and the second engine flowpath outlet each fluidly coupled with the first engine flowpath; and a fuel cell system including a fuel cell, a fuel circuit and an air circuit, the fuel circuit extending through the fuel cell and fluidly coupled with and upstream of a first fuel injector in the second engine combustor section, and the air circuit extending through the fuel cell and fluidly coupled with and downstream of a bleed from the second engine flowpath.

2. The powerplant of claim 1, wherein the fuel cell comprises a solid oxide fuel cell.

3. The powerplant of claim 1, wherein the second engine combustor section comprises a second engine combustor; and the bleed is upstream of the second engine combustor along the second engine flowpath.

4. The powerplant of claim 3, wherein an outlet from the air circuit is fluidly coupled with the second engine flowpath at or downstream of the bleed along the second engine flowpath.

5. The powerplant of claim 3, wherein an outlet from the air circuit is fluidly coupled with the second engine flowpath downstream of the second engine combustor along the second engine flowpath.

6. The powerplant of claim 1, wherein the air circuit is fluidly coupled with the second engine flowpath in parallel with a combustion chamber within a second engine combustor within the second engine combustor section.

7. The powerplant of claim 1, wherein the fuel cell system further includes a fuel reformer; and the fuel circuit extends through the fuel reformer upstream of the fuel cell.

8. The powerplant of claim 1, wherein the second engine combustor section includes the first fuel injector and a second fuel injector; and the second fuel injector is fluidly decoupled from the fuel cell.

9. The powerplant of claim 1, wherein the second engine combustor section includes the first fuel injector and a second fuel injector; and the fuel cell is further fluidly coupled with and upstream of the second fuel injector.

10. The powerplant of claim 1, wherein the first turbine engine further includes an engine case housing the first engine compressor section, the first engine combustor section and the first engine turbine section; and the fuel cell is arranged outside of the engine case.

11. The powerplant of claim 10, further comprising:

a nacelle;

the fuel cell arranged in a compartment formed by and between the engine case and the nacelle.

12. The powerplant of claim 1, wherein the second turbine engine further includes an engine case housing the second engine compressor section, the second engine combustor section and the second engine turbine section; and the fuel cell is arranged outside of the engine case.

13. The powerplant of claim 1, wherein the first engine combustor section comprises a first engine combustor; and the second engine flowpath inlet and the second engine flowpath outlet are each fluidly coupled with the first engine flowpath upstream of the first engine combustor.

14. The powerplant of claim 13, wherein the second engine flowpath inlet is at or upstream of the second engine flowpath outlet along the first engine flowpath.

15. The powerplant of claim 1, further comprising:

a gear system;

the first turbine engine further including a first engine rotating assembly operatively coupled to the gear system, and the first engine rotating assembly comprising a first engine turbine rotor in the first engine turbine section; and the second turbine engine further including a second engine rotating assembly operatively coupled to the gear system, and the second engine rotating assembly comprising a second engine turbine rotor in the second engine turbine section.

16. The powerplant of claim 15, further comprising:

a powerplant accessory;

the gear system comprising a differential drive operatively coupling the first engine rotating assembly and the second engine rotating assembly to the powerplant accessory.

17. The powerplant of claim 1, wherein the first turbine engine comprises a turbofan engine.

18. The powerplant of claim 1, further comprising a propulsor rotor rotatably driven by a rotating assembly within the first turbine engine.

* * * * *